(12) United States Patent
Davis et al.

(10) Patent No.: US 10,982,541 B2
(45) Date of Patent: Apr. 20, 2021

(54) METHODS AND SYSTEMS FOR CONTROLLING THE HEADING OF A MINING MACHINE

(71) Applicant: Joy Global Underground Mining LLC, Warrendale, PA (US)

(72) Inventors: Lee Davis, Cranberry Township, PA (US); Daniel C. Ferguson, Cecil, PA (US); Eric Humenay, Springdale, PA (US); Rick Rogers, Slippery Rock, PA (US)

(73) Assignee: JOY GLOBAL UNDERGROUND MINING LLC, Warrendale, PA (US)

( * ) Notice: Subject to any disclaimer, the term of this patent is extended or adjusted under 35 U.S.C. 154(b) by 0 days.

(21) Appl. No.: 16/427,684

(22) Filed: May 31, 2019

(65) Prior Publication Data

US 2019/0369255 A1 Dec. 5, 2019

Related U.S. Application Data

(60) Provisional application No. 62/679,424, filed on Jun. 1, 2018, provisional application No. 62/681,345, filed on Jun. 6, 2018.

(51) Int. Cl.
*E21C 35/08* (2006.01)
*E21C 35/24* (2006.01)
(Continued)

(52) U.S. Cl.
CPC .............. *E21C 35/08* (2013.01); *E21C 35/24* (2013.01); *E21C 27/24* (2013.01); *E21C 29/22* (2013.01);
(Continued)

(58) Field of Classification Search
CPC .......... E21D 9/004; E21D 9/108; E21D 9/003; G01S 2201/02; G01S 17/88; G01S 17/89;
(Continued)

(56) References Cited

U.S. PATENT DOCUMENTS 4,023,861 A 5/1977 Schnell
4,688,937 A 8/1987 Konig et al.
(Continued)

FOREIGN PATENT DOCUMENTS

CA 3042564 A1 2/2013
CA 2897043 A1 2/2016
(Continued)

OTHER PUBLICATIONS

Fekete, Stephanie, "Geotechnical Applications of LiDAR for Geomechanical Characterization in Drill and Blast Tunnels and Representative 3-Dimensional Discontinuum Modelling", Sep. 2010, Queen's University, Kingston, Ontario, Canada.
(Continued)

*Primary Examiner* — David J Bagnell
*Assistant Examiner* — Michael A Goodwin
(74) *Attorney, Agent, or Firm* — Michael Best & Friedrich LLP

(57) ABSTRACT

Methods and systems for controlling the heading of a mining machine while the mining machine performs a cutting operation. One system includes a cutting system and a set of left and right tracks of the mining machine. The system also includes a lidar sensor mounted to the mining machine. The system also includes an electronic processor configured to receive the data from the lidar sensor. The electronic processor is also configured to determine a current heading of the mining machine based on the data received from the lidar sensor and compare the current heading to a target heading of the mining machine. In response to the current heading
(Continued)

not being different from the target heading of the mining machine by a predetermined amount, the electronic processor is configured to control the mining machine to adjust the current heading of the mining machine.

20 Claims, 12 Drawing Sheets

(51) Int. Cl.
    *E21C 27/24* (2006.01)
    *G01S 17/88* (2006.01)
    *E21C 29/22* (2006.01)
    *E21C 31/08* (2006.01)
    *E21D 9/10* (2006.01)
    *E21D 9/00* (2006.01)

(52) U.S. Cl.
    CPC .............. *E21C 31/08* (2013.01); *E21D 9/004* (2013.01); *E21D 9/108* (2013.01); *G01S 17/88* (2013.01)

(58) Field of Classification Search
    CPC ........ G01S 17/894; G01S 17/90; G01S 17/93; G01S 17/931; G01S 1/042; G01S 1/70; G01S 1/74; E21C 35/24; E21C 35/08; E21C 27/24
    See application file for complete search history.

(56) References Cited

U.S. PATENT DOCUMENTS

| | | | | |
|---|---|---|---|---|
| 6,608,913 B1* | 8/2003 | Hinton | ................... | B82Y 15/00 |
| | | | | 382/104 |
| 9,797,247 B1 | 10/2017 | Nelson et al. | | |
| 2011/0066313 A1* | 3/2011 | Larsson | ................... | G01C 7/06 |
| | | | | 701/25 |
| 2012/0130598 A1* | 5/2012 | Hukkeri | ................... | G01S 17/48 |
| | | | | 701/49 |
| 2015/0051828 A1* | 2/2015 | Smith | ................... | G01S 5/0257 |
| | | | | 701/446 |
| 2016/0341041 A1* | 11/2016 | Puura | ...................... | E21D 9/003 |
| 2017/0234129 A1 | 8/2017 | Preston et al. | | |
| 2017/0275993 A1 | 9/2017 | Rimmington | | |
| 2017/0276777 A1 | 9/2017 | Rimmington | | |
| 2018/0023390 A1* | 1/2018 | Moberg | ................... | E21C 41/16 |
| | | | | 299/1.4 |
| 2018/0171799 A1* | 6/2018 | Moberg | ................ | E21D 9/1093 |

FOREIGN PATENT DOCUMENTS

| | | |
|---|---|---|
| CN | 106441293 A | 2/2017 |
| CN | 107130975 A | 9/2017 |
| CN | 107227956 A | 10/2017 |
| GB | 2550662 A | 11/2017 |
| PL | 231928 B1 | 4/2019 |
| WO | 2015107068 A1 | 7/2015 |
| WO | 2016121688 A1 | 8/2016 |
| WO | 2017063018 A1 | 4/2017 |
| WO | 2018017229 A1 | 1/2018 |
| WO | 2018112337 A1 | 6/2018 |

OTHER PUBLICATIONS

Gallant, Marc, "Axis Mapping: The Estimation of Surface Orientations and its Applications in Vehicle Localization and Structrual Geology", Sep. 2016, Queen's University, Kingston, Ontario, Canada.
Zhi et al., "Key technology of mine underground mobile positioning based on LiDAR and coded sequence pattern", Transactions of the Nonferrous Metals Society of China, vol. 21, issue 3, Dec. 2011, pp. 570-576.
United Kingdom Intellectual Property Office Search Report for Application No. 1907718.9 dated Nov. 26, 2019 (3 pages).
Polish Patent Office Search Report for Application P-430083 dated Nov. 13, 2019 (7 pages including English translation).

* cited by examiner

METHODS AND SYSTEMS FOR CONTROLLING THE HEADING OF A MINING MACHINE

RELATED APPLICATIONS

This application claims the benefit of U.S. Provisional Application No. 62/679,424, filed Jun. 1, 2018, and U.S. Provisional Application No. 62/681,345, filed Jun. 6, 2018, the entire contents of all of which are hereby incorporated by reference.

FIELD

Embodiments of the invention relate to methods and systems for controlling the heading of a mining machine while the mining machine performs a cutting operation.

BACKGROUND

Various techniques have been used to control the heading of mining equipment. Heading control in an above-ground environment relies primarily on satellite-based global positioning systems (GPS) positioning augmented with inertial sensors, such as gyroscopes. In underground environments, lidar sensors have been used to control mobile equipment traveling through existing mines in limited scenarios, but not to control heading while cutting. Rather, heading control while cutting has been accomplished by an operator controlling a mining machine using visual inspection of the machine and the mine ribs (for example, walls), sometimes with a single spot or line laser emitter mounted off of the machine and used for visual reference.

SUMMARY

Controlling the heading of a continuous miner while cutting into a mineral seam presents a difficult problem because neither sensors nor reference points may be placed ahead of the machine, since the material has not yet been removed. Further, the underground environment prevents the use of GPS and gyroscopes are ineffective due to the combination of slow machine movement and high vibration.

Heading control is a feature desired in the mining industry for consistent cutting and adherence to a mine plan. As noted, heading control while cutting is currently performed manually by operators based on their visual observation. The lack of accuracy and difficulty in observing a deviation frequently results in significant corrections and either noticeable steps in a rib or corrective cuts to remove the steps, and, thereby resulting in a loss of productivity.

Accordingly, embodiments described herein provide methods and systems for controlling a heading of a mining machine. A purpose of some of the methods and systems described herein is to measure and control relative machine heading as the machine cuts into new material by using machine-mounted lidar sensors to measure the previously cut features of the mine behind and to the side of the machine without requiring the use of sensors or emitters mounted off of the machine. The information collected by the one or more lidar sensors is used to control the heading as the cutting machine is cutting in a forward direction. In some embodiments, the data collected by the lidar sensor(s) may be integrated with data from other machine-mounted sensors, such as cameras or ultra-wideband measuring devices. Alternatively or in addition, in some embodiments, because the previously cut features will be measured and used as a basis for the heading control of future cuts, the previously cut features of the mine are first surveyed, before being measured by the mining machine and used to control future cuts, to verify that the previously cut features are in adherence to a mine plan.

Accordingly, embodiments provide methods and systems for controlling the heading of a mining machine while the mining machine performs a cutting operation. For example, one embodiment provides a system for controlling a heading of a mining machine while the mining machine performs a cutting operation. The system includes a cutting system of the mining machine and a set of tracks of the mining machine including a left track and a right track. The system also includes a lidar sensor mounted to the mining machine, the lidar sensor configured to emit a pulse of light towards a previously cut mining surface and receive a pulse of light reflected back from the previously cut mining surface. The system also includes an electronic processor. The electronic processor is configured to receive data from the lidar sensor based on the light pulse received by the lidar sensor. The electronic processor is also configured to determine a current heading of the mining machine based on the data received from the lidar sensor and compare the current heading to a target heading of the mining machine. In response to the current heading not being different from the target heading of the mining machine by a predetermined amount, the electronic processor is configured to control the mining machine to adjust the current heading of the mining machine.

In some embodiments, the lidar sensor is mounted to a rear portion of the mining machine. In other embodiments, a first lidar sensor is mounted to a first side portion of the mining machine and a second lidar sensor is mounted to a second side portion of the mining machine.

Another embodiment includes a method for controlling a heading of a mining machine while the mining machine performs a cutting operation. The method includes receiving, with an electronic processor, data from a lidar sensor mounted on the mining machine. The method also includes determining, with the electronic processor, a current heading of the mining machine based on data received from the lidar sensor, the data generated by the lidar sensor based on the pulse of light received by the lidar sensor. The method also includes comparing, with the electronic processor, the current heading to a target heading of the mining machine. The method also includes, in response to the current heading not being different from the target heading of the mining machine by a predetermined amount, controlling, with the electronic processor, the mining machine to adjust the current heading of the mining machine.

Other aspects of the invention will become apparent by consideration of the detailed description and accompanying drawings.

DETAILED DESCRIPTION

Figure 1A:
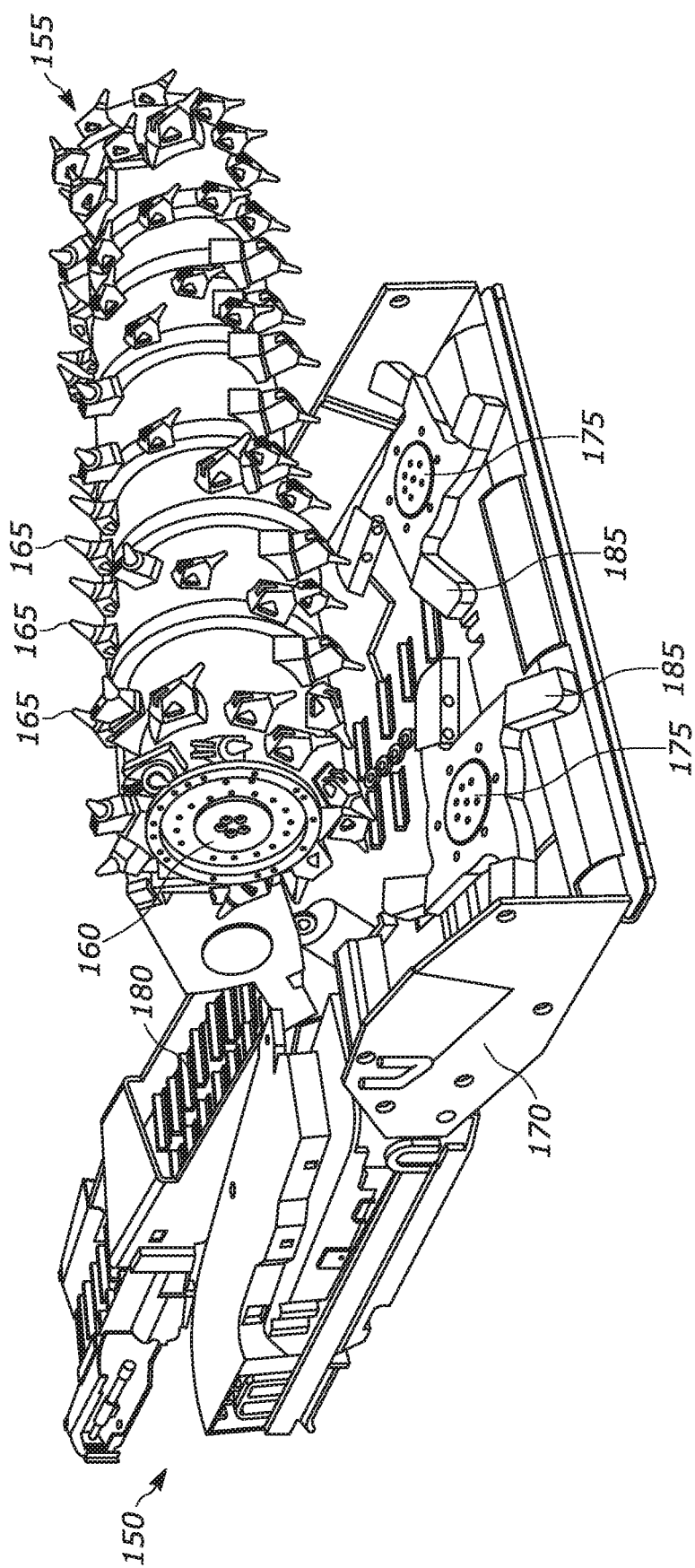
FIGS. 1A-1C illustrate a mining machine.

Before any embodiments are explained in detail, it is to be understood that the embodiments described herein are not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more electronic processors. As such, it should be noted that a plurality of hardware and software based devices, as well as a plurality of different structural components may be utilized to implement the invention. For example, "control units" and "controllers" described in the specification can include one or more electronic processors, one or more memory modules including non-transitory computer-readable medium, one or more input/output interfaces, and various connections (for example, a system bus) connecting the components.

As noted above, controlling the heading of a continuous miner while cutting into a mineral seam presents a difficult problem because neither sensors nor reference points may be placed ahead of the machine, at least at the same level, since the material has not yet been removed. Alternatively or in addition, some types of sensors, such as an inertial measurement unit, fail to provide heading measurements with sufficient precision for mining applications. Embodiments described herein address the problems and provide methods and systems for controlling the heading of a mining machine while the mining machine performs a cutting operation.

Figure 1B:
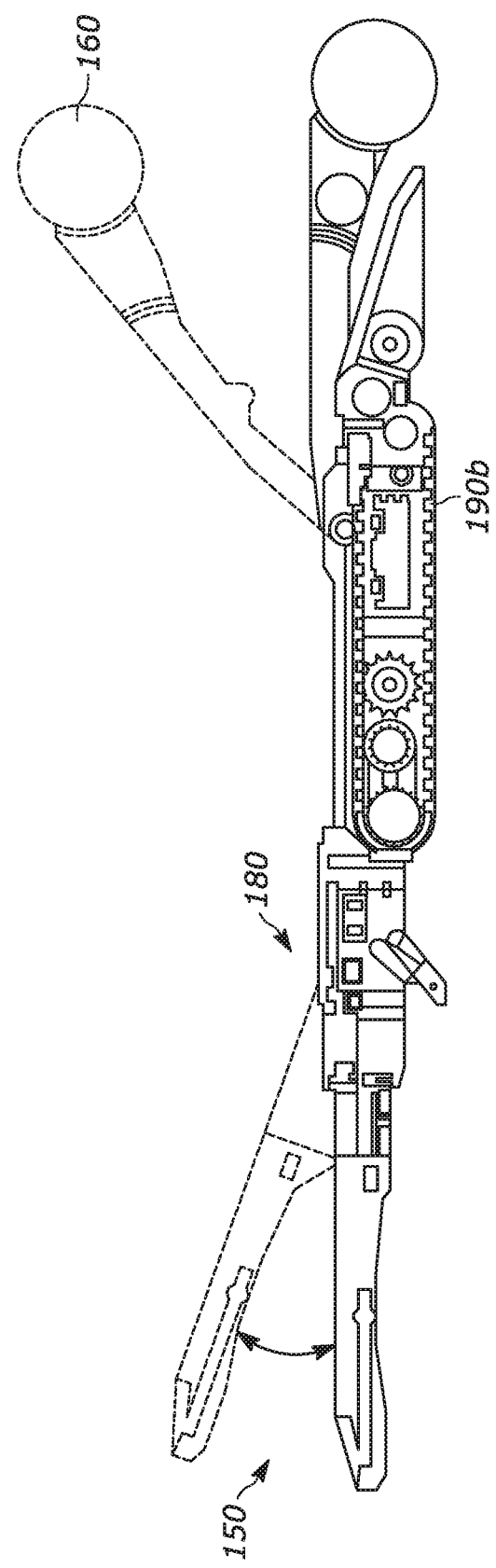
Figure 1C:
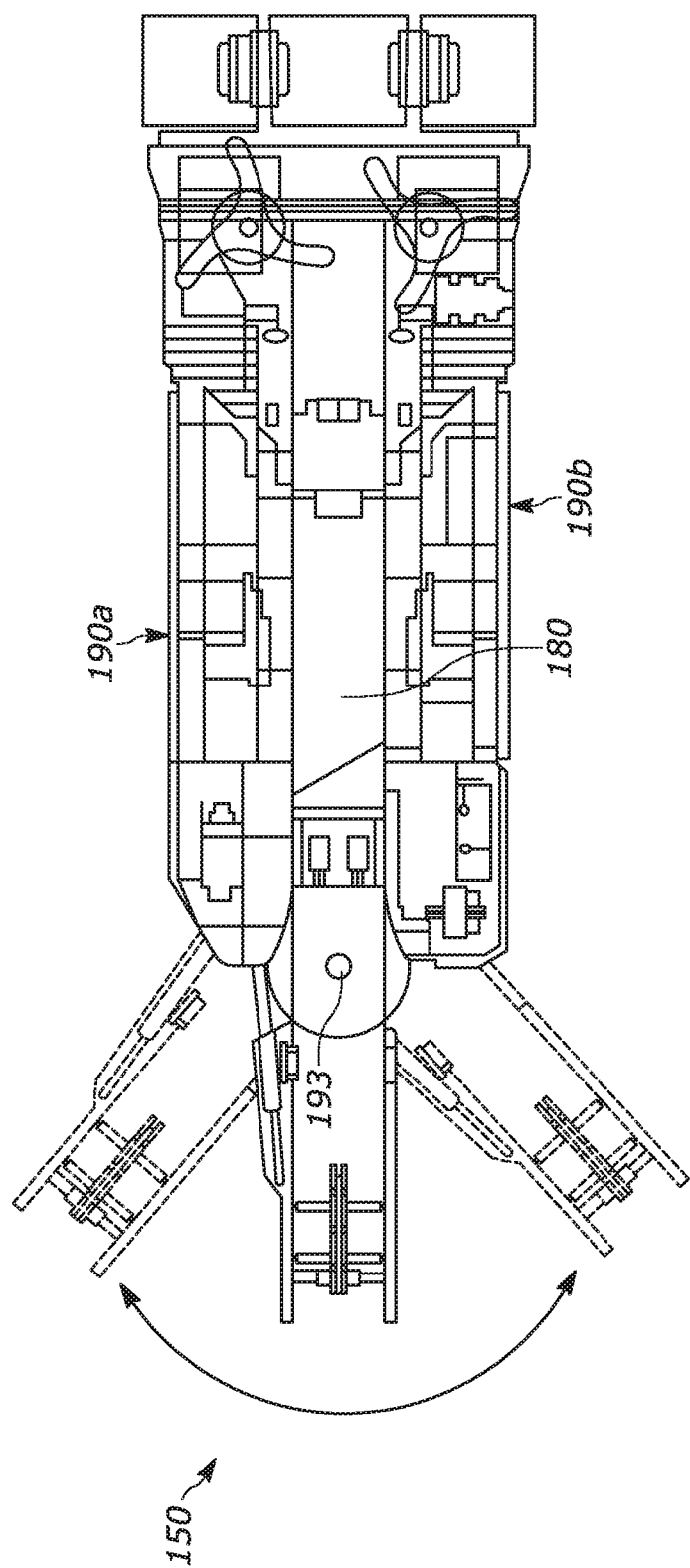

FIGS. 1A-1C illustrate a continuous miner 150 (for example, a mining machine). The continuous miner 150 includes a cutter system 155, which includes rotating cutters 160 with teeth 165 that, essentially, scrape ore (for example, coal) from a wall or ceiling in a mine shaft. The cutter system 155 is rotationally driven by a pair of motors via a gear box. That is, the gear box receives the rotational output of the motor pair and, in turn, drives the cutters 160. Falling ore is gathered in a collecting tray 170 and funneled by gathering heads 175 toward a conveyor 180. The gathering heads 175 are each rotated by a separate motor and the arms 185 push ore within the collecting tray 170 onto the conveyor 180. The continuous miner 150 further includes left tracks 190a and right tracks 190b to provide movement of the entire machine. Each set of tracks 190a-b is driven by a separate motor. As shown in FIG. 1B, the cutter system 155 and conveyor 180 may be raised and lowered, and, as shown in FIG. 1C, the conveyor 180 may be pivoted about a pivot point 193.

Figure 2:
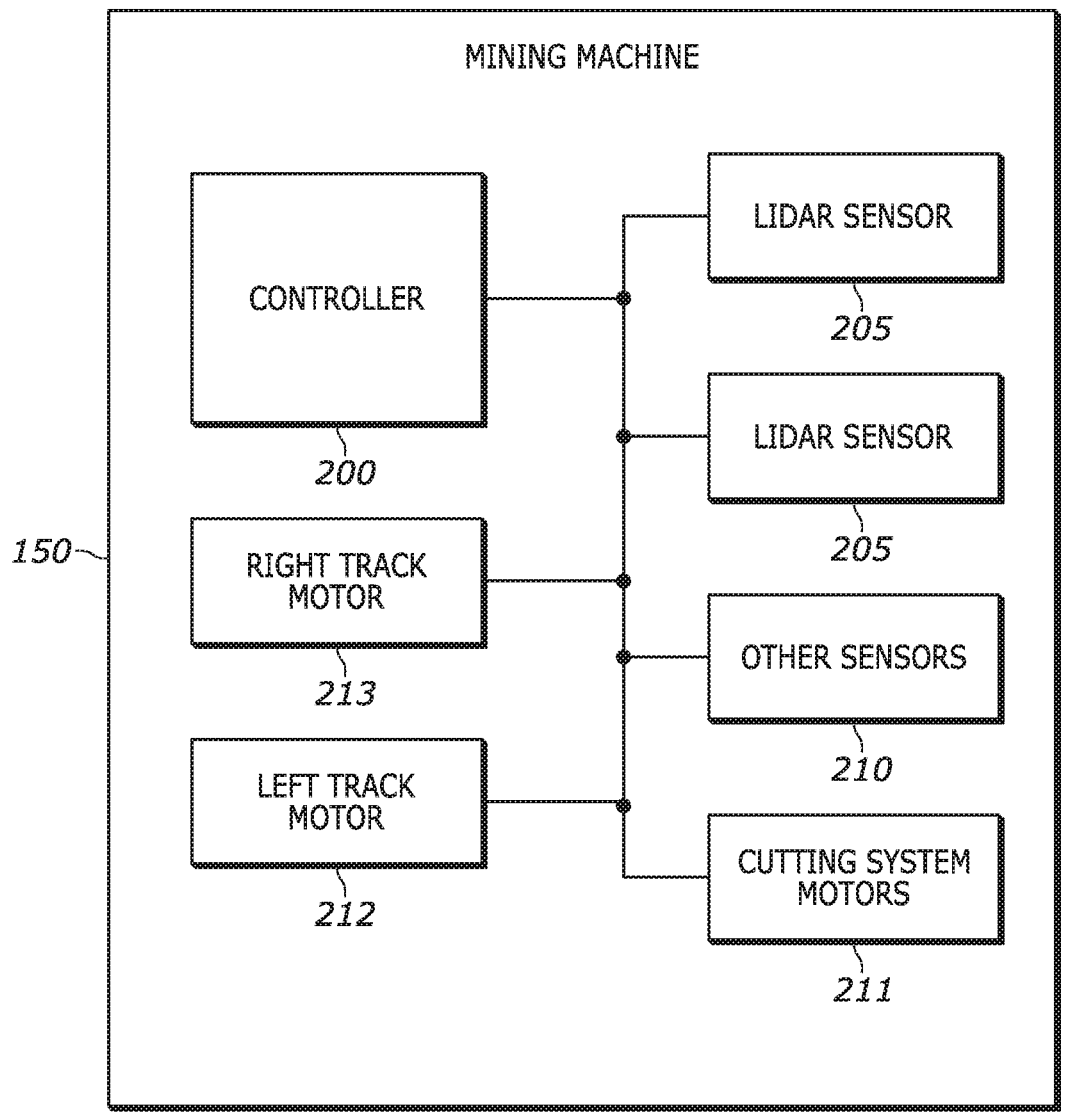
FIG. 2 illustrates a system for controlling a heading of a mining machine according to some embodiments.

FIG. 2 illustrates a system 195 for controlling the heading of the mining machine 150 while the mining machine 150 performs a cutting operation according to some embodiments. As illustrated in FIG. 2, the system 195 includes a controller 200, a plurality of lidar sensors 205, and other sensors 210 associated with the mining machine 150. In some embodiments, the system 195 includes fewer, additional, or different components than those illustrated in FIG. 2 in various configurations and may perform additional functionality than the functionality described herein. For example, in some embodiments the system 195 includes a single lidar sensor 205 or more than two lidar sensors 205. The system 195 further includes cutting system motors 211, left track motor 212, and right track motor 213. In other embodiments, the system 195 includes other components associated with the mining machine 150, such as one or more actuators, motors, pumps, and the like.

Figure 3:
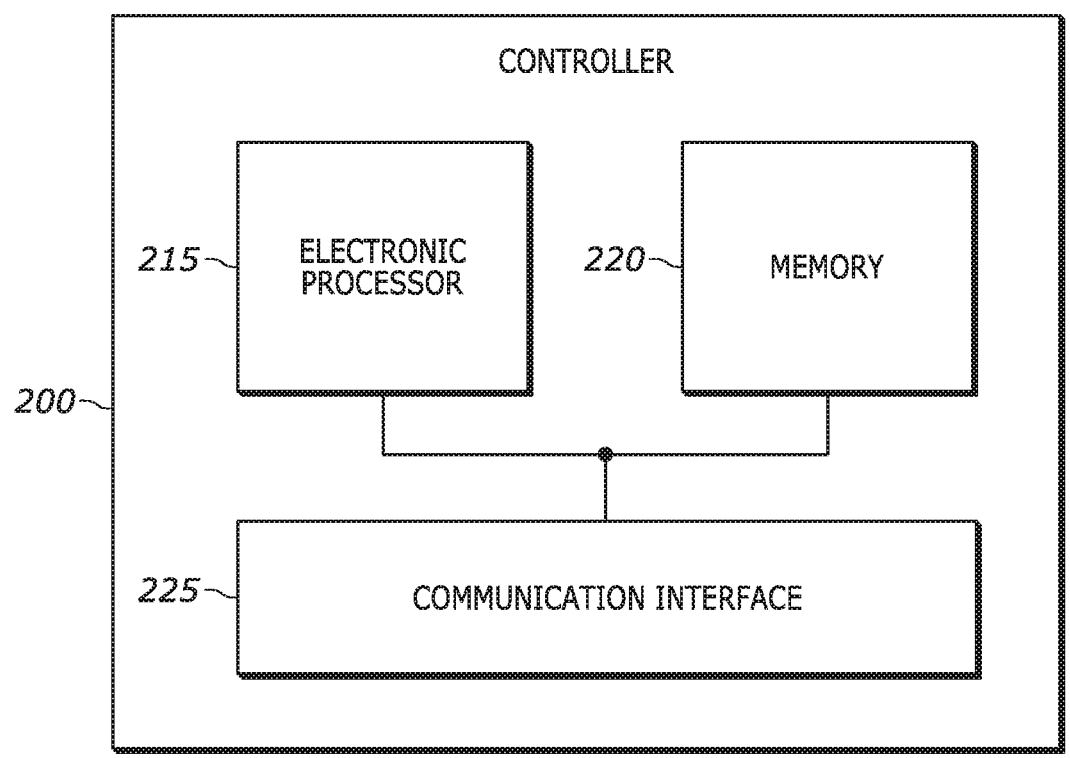
FIG. 3 illustrates a controller of the system illustrated in FIG. 2 according to some embodiments.

In the example illustrated in FIG. 3, the controller 200 includes an electronic processor 215 (for example, a microprocessor, an application specific integrated circuit, or another suitable electronic device), a memory 220 (for example, one or more non-transitory computer-readable storage mediums), and an input/output interface 225. The electronic processor 215, the memory 220, and the input/output interface 225 communicate over one or more data connections or buses, or a combination thereof. The controller 200 illustrated in FIG. 3 represents one example, and, in some embodiments, the controller 200 includes fewer, additional, or different components in different configurations than illustrated in FIG. 3. Also, in some embodiments, the controller 200 performs functionality in addition to the functionality described herein.

The electronic processor 215 is configured to retrieve instructions from the memory 220 and execute instructions to perform a set of functions, including the methods described herein. For example, in some embodiments, the electronic processor 215 executes instructions for controlling a heading of the mining machine 150 while the mining machine 150 performs a cutting operation. The memory 220 may include combinations of different types of memory, such as read-only memory ("ROM"), random access memory ("RAM"), or another non-transitory computer readable medium. As noted above, the memory 220 stores instructions executed by the electronic processor 215. The memory 220 may also store data, such as a data collected by the lidar sensors 205, the other sensors 210, or a combination thereof. The memory 220 may also store firmware, one or more applications, program data, filters, rules, one or more program modules, and other executable instructions or data.

The input/output interface 225 allows the controller 200 to communicate with devices external to the controller 200 (for example, receive input from and provide output to devices external to the controller 200 directly or indirectly). In one example, the controller 200 communicates with one or more of the lidar sensors 205, the other sensors 210, the cutting system motors 211, left track motor 212, and right track motor 213 or a combination thereof through the input/output interface 225. In some embodiments, the input/output interface 225 includes a port for receiving a wired connection to the lidar sensors 205, the other sensors 210, or a combination thereof. Alternatively or in addition, the input/output interface 225 includes a transceiver for establishing a wireless connection to the lidar sensors 205, the other sensors 210, or a combination thereof. Alternatively or in addition, the input/output interface 225 communicates with a communication bus (for example, a controller area network ("CAN")) to indirectly communicate with, for example, the lidar sensors 205, the other sensors 210, or a combination thereof.

Returning to FIG. 2, the system 195 also includes the cutting system motors 211, left track motor 212, and right track motor 213. The cutting system motors 211 include the motors that drive the cutters 160, the gathering heads 175, and the conveyor 180. The left track motor 212 drives the left track 190a and the right track motor 213 drives the right track 190b. The controller 200 is configured to control each of these motors.

The system 195 further includes one or more lidar sensors 205. The lidar sensors 205 emit light pulses towards a surface and receive light pulses reflected back from the surface. Based on the emitted and received light pulses, the lidar sensor(s) 205 may determine a distance between the lidar sensor 205 and the surface. For example, the lidar sensor(s) 205 may include a timer circuit to calculate a time of flight of a light pulse (from emission to reception), and then to divide the time of flight by the speed of light to determine a distance from the surface. In other embodiments, wavelengths of a received light pulse are compared to a reference light pulse to determine a distance between the lidar sensor 205 and the surface. In some embodiments, by the lidar sensor 205 taking and providing to the electronic processor 215 a series of distance measurements of different target points (for example, by scanning an area), the electronic processor 215 is configured to generate a digital two-dimensional or three-dimensional representation of the target (for example, the surface).

In other words, the lidar sensors 205 are configured to detect data (information) associated with the surroundings of the mining machine 150. In particular, the lidar sensors (for example, the lidar sensors 205) are configured to measure mine features that were previously cut behind the mining machine 150, to one or more sides of the mining machine 150, or a combination thereof (previously cut features). In some embodiments, the lidar sensors 205 are configured to measure mine features that were previously cut in front of the mining machine 150 at another level. For example, in the case of multi-level mine plans where a seam is removed using multiple passes at increasingly lower levels, the lidar sensors 205 are configured to measure mine features that were previously cut ahead of a current position of the mining machine 150 but at a higher level than the current position. In other words, the lidar sensors 205 are configured to detect or collect data relating to one or more previously cut mining surfaces. The lidar sensors 205 provide the detected data to the electronic processor 215. Accordingly, using the lidar sensors 205, the electronic processor 215 is configured to determine and measure mine features related to previously cut mining surfaces.

Figure 4:
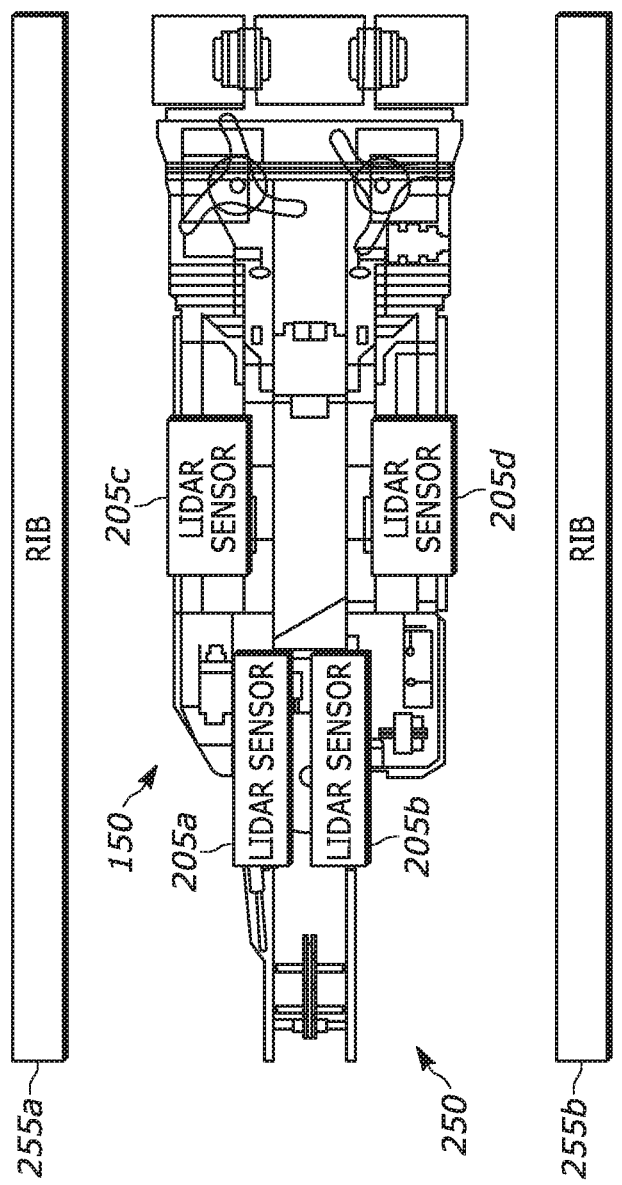
FIG. 4 illustrates a plurality of lidar sensors mounted on a mining machine according to some embodiments.

As illustrated in FIG. 4, the one or more lidar sensors 205 are mounted on the mining machine 150. In the exampled illustrated in FIG. 4, four lidar sensors 205 (shown as 205a, 205b, 205c, and 205d) are mounted on the mining machine 150. The mining machine 150 is positioned in a mine shaft 250 between a rib 255a and a second rib 255b.

Figure 5A:
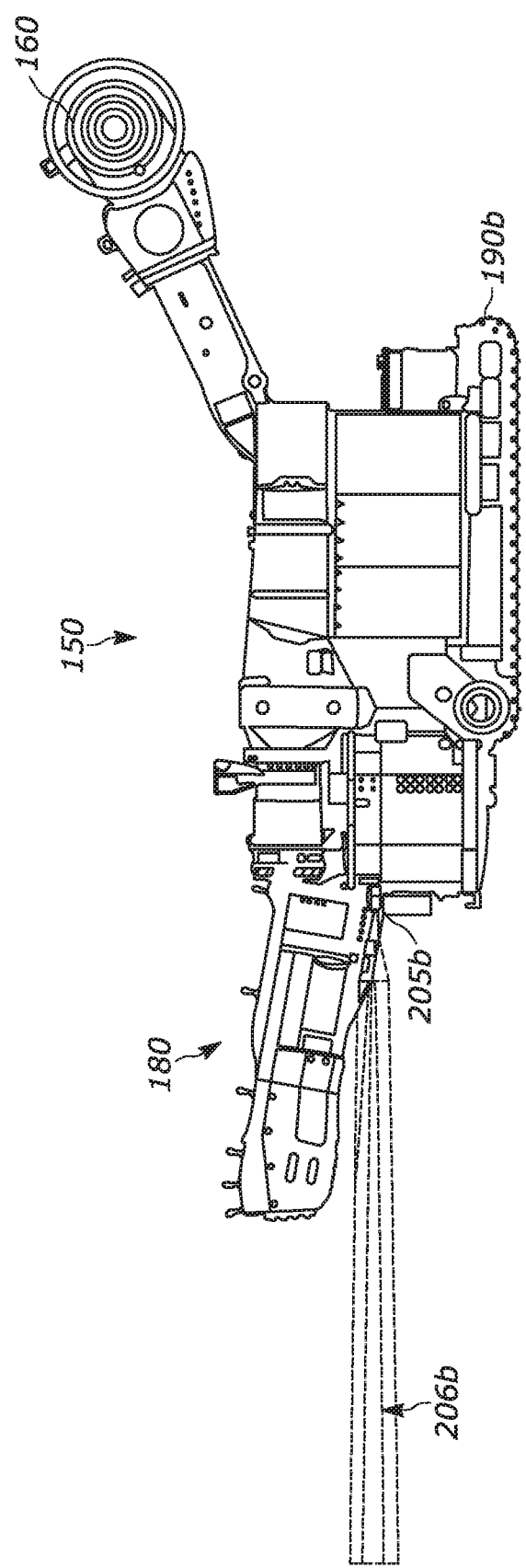
FIG. 5A is a side view of a mining machine with a lidar sensor mounted on a rear portion of the mining machine according to some embodiments.
Figure 5B:
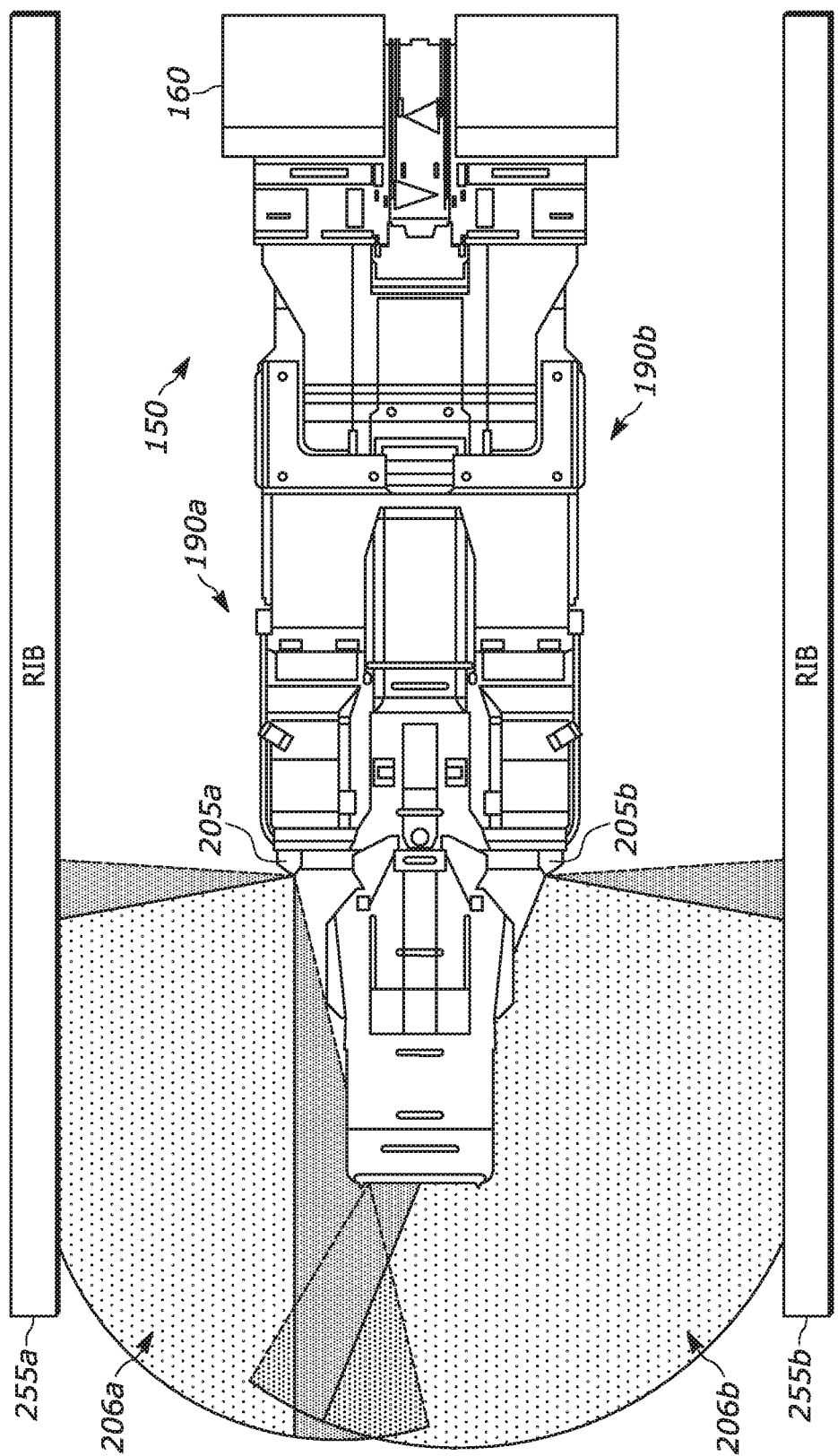
FIG. 5B is a top view of a mining machine with two lidar sensors mounted on a rear portion of the mining machine according to some embodiments.

As seen in FIG. 4, a first lidar sensor 205a and a second lidar sensor 205b are mounted on a rear portion of the mining machine 150. The first lidar sensor 205a and the second lidar sensor 205b detect data associated with the rear surroundings of the mining machine 150 (previously cut features behind the mining machine 150). For example, FIGS. 5A-5B illustrate the first lidar sensor 205a and the second lidar sensor 205b detecting data associated with the rear surroundings of the mining machine 150. FIG. 5A is a side view of the mining machine 150 and FIG. 5B is a top view of the mining machine 150. As seen in FIGS. 5A-5B, the first lidar sensor 205a has a first detection range 206a and the second lidar sensor 205b has a second detection range 206b. Accordingly, the first lidar sensor 205a detects data associated with previously cut features within the first detection range 206a and the second lidar sensor 205b detects data associated with previously cut features within the second detection range 206b. In some embodiments, as illustrated in FIG. 5B, the first lidar sensor 205a and the second lidar sensor 205b are aimed at different areas and, accordingly, the first detection range 206a and the second detection range 206b are different. In some embodiments, the first detection range 206a and the second detection range 205b, while different, include an overlapping portion, such as illustrated in FIG. 5B. In some embodiments, the rear portion of the mining machine 150 includes the portion of the mining machine 150 rearward of a midpoint of the mining machine 150 (i.e., the rear half of the mining machine 150 along a longitudinal axis of the mining machine 150). In some embodiments, the rear portion of the mining machine 150 includes the rear one-third portion, the rear one-fourth portion, or the rear one-fifth portion of the mining machine 150. In some embodiments, one or more of the first and second lidar sensors 205a, 205b are positioned on a rearward-facing surface of the rear portion of the mining machine 150.

Figure 6A:
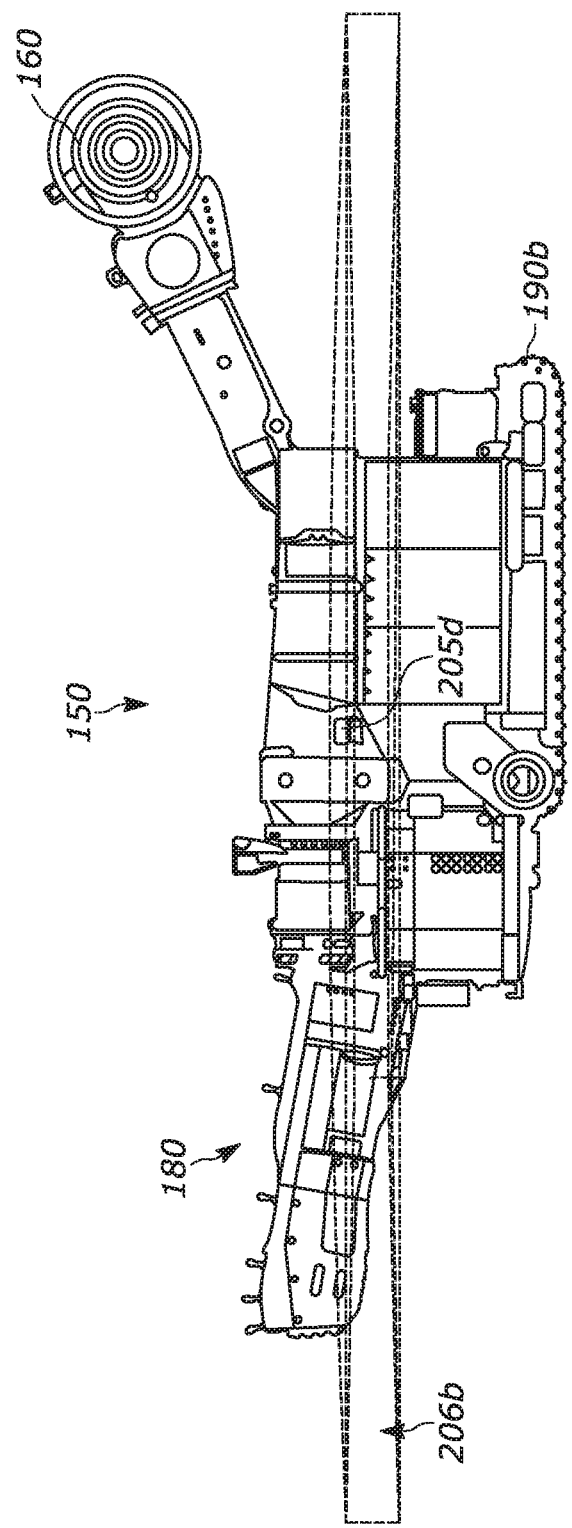
FIG. 6A is a side view of a mining machine with a lidar sensor mounted on a side portion of the mining machine according to some embodiments.
Figure 6B:
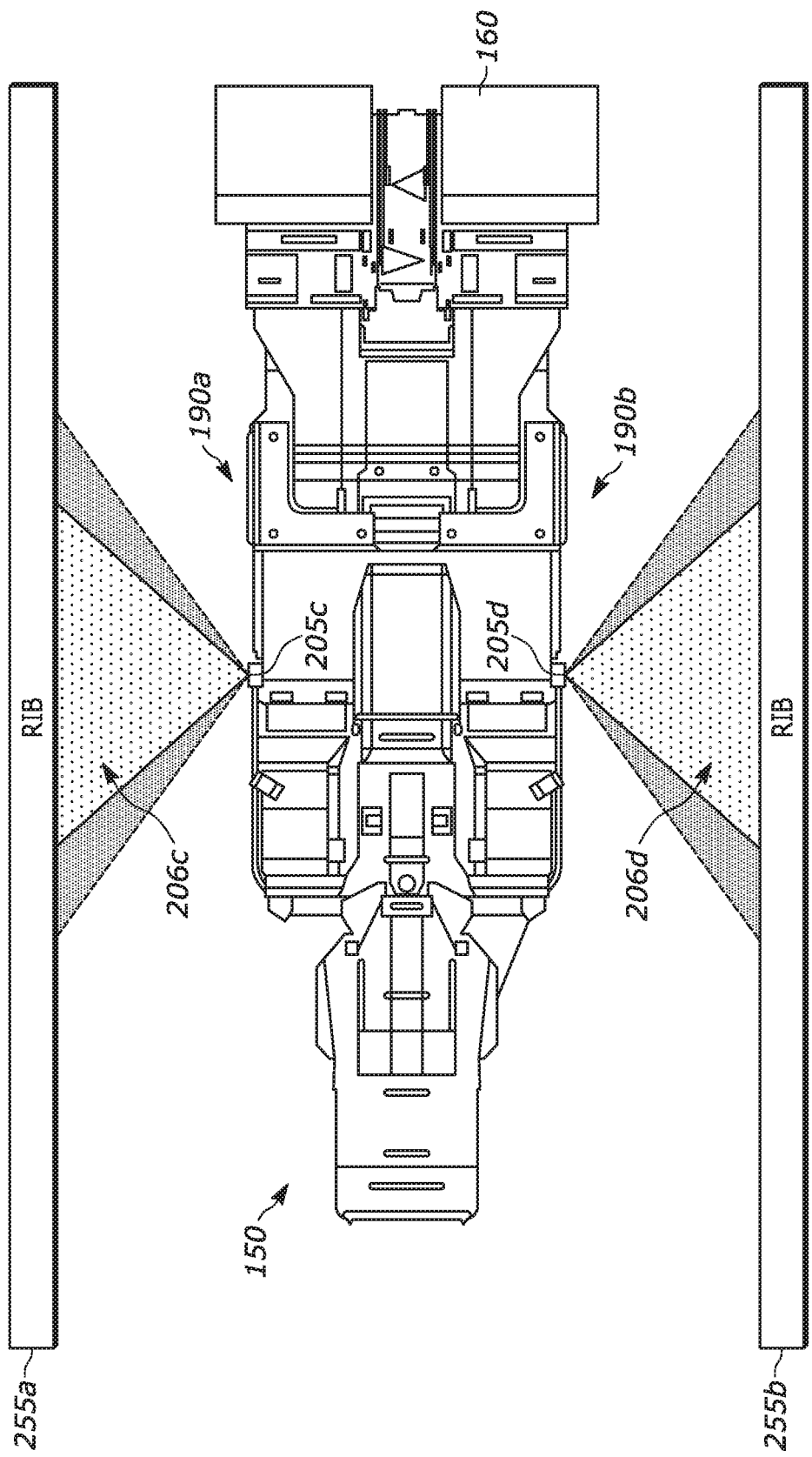
FIG. 6B is a top view of a mining machine with two lidar sensors mounted on two side portions of the mining machine according to some embodiments.

Additionally, as seen in FIG. 4, the third lidar sensor 205c is mounted on a first side portion of the mining machine 150 and the fourth lidar sensor 205d is mounted on a second side portion of the mining machine 150. The third lidar sensor 205c detects data associated with a first side portion surroundings of the mining machine 150 and the fourth lidar sensor 205d detects data associated with a second side portion surroundings of the mining machine 150. For example, FIGS. 6A-6B illustrate the third lidar sensor 205c and the fourth lidar sensor 205d detecting data associated with a first side portion surroundings and a second side portion surroundings, respectively, of the mining machine 150. FIG. 6A is a side view of the mining machine 150 and FIG. 6B is a top view of the mining machine 150. As seen in FIGS. 6A-6B, the third lidar sensor 205c has a third detection range 206c and the fourth lidar sensor 205d has a fourth detection range 206d. Accordingly, the third lidar sensor 205c detects data associated with previously cut features within the third detection range 206c and the fourth lidar sensor 205d detects data associated with previously cut features within the fourth detection range 206d. For example, the third lidar sensor 205c is configured to provide the electronic processor 215 distances measurements between the third lidar sensor 205c and various points of the first rib 255a, and the fourth lidar sensor 205d is configured to provide the electronic processor 215 distances measurements between the fourth lidar sensor 205d and various points of the second rib 255b. In some embodiments, as illustrated in FIG. 6B, the third lidar sensor 205c and the fourth lidar sensor 205d are aimed at different areas and, accordingly, the third detection range 206c and the fourth detection range 206d are different. In some embodiments, the third detection range 206c and the fourth detection range 205d, are non-overlapping ranges, such as illustrated in FIG. 6B. In some embodiments, each side portion of the mining machine 150 (e.g., the left side portion) includes the portion of the mining machine 150 to a respective side of a midpoint of the mining machine 150 (e.g., the left half of the mining machine 150). In some embodiments, the side portion of the mining machine 150 includes the side one-third portion, the side one-fourth portion, or the side one-fifth portion of the mining machine 150. In some embodiments, one or more of the lidar sensors 205 are positioned on a side-facing surface of the side portion of the mining machine 150.

Alternatively or in addition, in some embodiments, additional or fewer lidar sensors 205 are mounted on the mining machine than illustrated in FIGS. 4, 5A-5B, and 6A-6B. For example, in some embodiments, only one or more lidar sensors 205 are mounted on the rear portion of the mining machine 150. However, in other embodiments, only one or more lidar sensors 205 are mounted on one or more of the side portions of the mining machine 150. Alternatively or in addition, in some embodiments, one or more lidar sensors 205 may be mounted on a front portion of the mining machine 150. The one or more lidar sensors 205 mounted to the front portion of the mining machine 150 may be configured to measuring mine features that were previously cut ahead of the current position of the mining machine 150 but at a higher level than the current positions (for example, in the case of a multi-level mine plan). In some embodiments, the front portion of the mining machine 150 includes the portion of the mining machine 150 frontward of a midpoint of the mining machine 150 (i.e., the front half of the mining machine 150 along a longitudinal axis of the mining machine 150). In some embodiments, the front portion of the mining machine 150 includes the front one-third portion, the front one-fourth portion, or the front one-fifth portion of the mining machine 150. In some embodiments, one or more of the lidar sensors 205 are positioned on a front-facing surface of the front portion of the mining machine 150.

Figure 7:
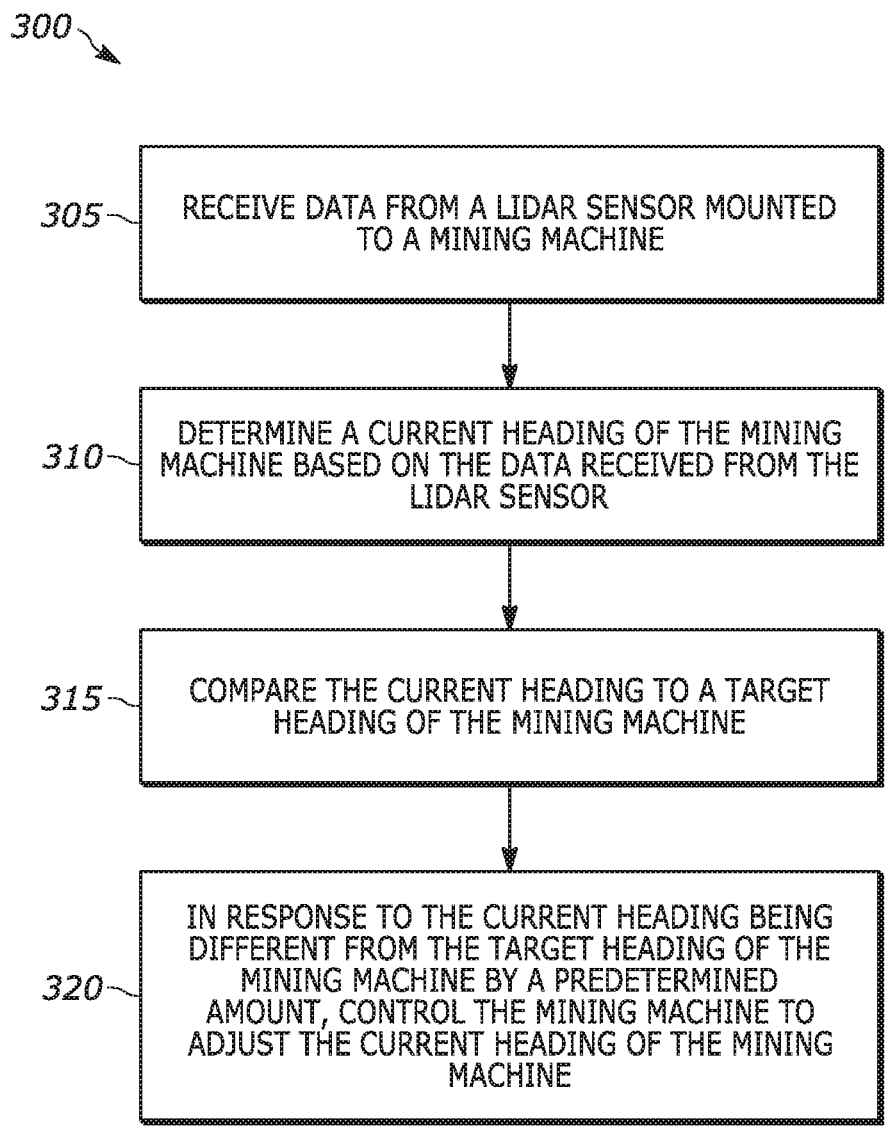
FIG. 7 is a flowchart illustrating a method for controlling a heading of a mining machine using the system of FIG. 2 according to some embodiments.

As noted above, the electronic processor 215 of the controller 200 executes instructions for controlling a heading of the mining machine 150 while the mining machine 150 performs a cutting operation. In particular, the electronic processor 215 executes instructions to perform the method 300 illustrated in FIG. 7 for controlling a heading of the mining machine 150 while the mining machine 150 performs a cutting operation. As illustrated in FIG. 7, the method 300 includes receiving, with the electronic processor 215, data from the lidar sensor 205 (at block 305). The electronic processor 215 receives the data from the lidar sensor 205 via the input/output interface 225 of the controller 200. As noted above, the data received from the lidar sensor 205 is associated with an area surrounding the mining machine 150. The area surrounding the mining machine 150 may include a rear surrounding of the mining machine 150, a front surrounding of the mining machine 150, one or more side portion surroundings of the mining machine 150, another surrounding of the mining machine 150, or a combination thereof. In particular, the data received from the lidar sensor 205 is associated with a previously cut mining surface.

The electronic processor 215 determines a current heading of the mining machine 150 based on the data received from the lidar sensor 205 (at block 310). The current heading of the mining machine 150, also referred to as a measured heading, represents a current travel path or travel trajectory of the mining machine 150. In some embodiments, the electronic processor 215 accesses a data analysis algorithm to determine the current heading of the mining machine 150. The data analysis algorithm may be stored in the memory 220 of the controller 200 and executed by the electronic processor 215, with the data from the lidar sensors 205 being input to the data analysis algorithm. Through execution of the data analysis algorithm, the electronic processor 215 identifies straight lines from the lidar-provided data that correspond to mine ribs (walls) (for example, "identified objects"). Accordingly, the electronic processor 215 may identify one or more objects as mine ribs that are sufficiently straight, have a sufficient length, have been detected for a sufficient time duration, or a combination thereof. Alternatively or in addition, in some embodiments, the electronic processor 215 determines the current heading of the mining machine 150 using an additional or different data processing approach. For example, in some embodiments, the electronic processor 215 determines the current heading of the mining machine 150 using a simultaneous localization and mapping (SLAM) algorithm. After identifying the one or more objects, the electronic processor 215 classifies the identified objects with a confidence score. The confidence score may indicate a confidence level associated with the classification of the one or more identified objects as being, for example, a mine rib(s) (for example, the ribs 255a and 255b) in order to reduce a likelihood of an incorrect classification (for example, a mining vehicle, a person, and the like). The electronic processor 215 may also measure an angle and a distance to the identified objects relative to the mining machine 150. Based on the measured angle and distance to the identified object, the electronic processor 215 may determine a final conclusion of current heading as well as a distance between the mining machine 150 and one or more mine ribs.

Figure 8:
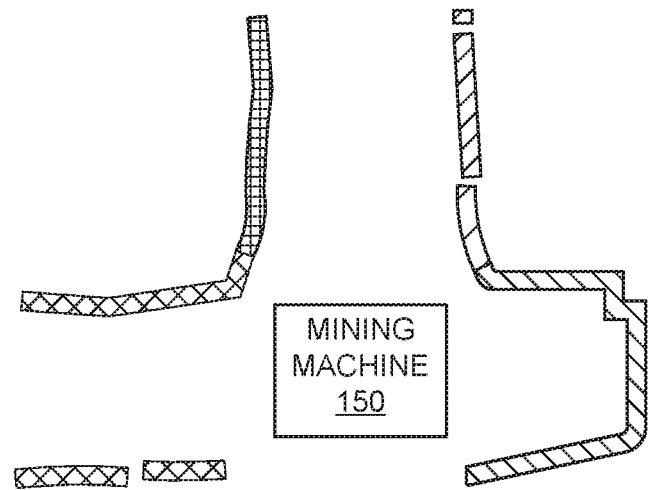
FIG. 8 is a two-dimensional coordinate mine map generated using data detected by one or more lidar sensors according to some embodiments.

As but one example, with reference to FIG. 4, when distance between the mining machine 150 and the ribs 255a and 255b are constant (as indicated by the measurement data from one or more of the lidar sensors 205c, 205b, 205c, and 205d), the electronic processor 215 is configured to determine that the mining machine 150 is heading straight within the mine shaft (a current heading). In other words, when the distance between the mining machine 150 and the ribs 255a and 255b are constant, the mining machine 150 is traveling parallel to the ribs 255a and 255b. However, when the distance between the mining machine 150 and the rib 255a decreases, while the distance between the mining machine 150 and the rib 255b increases, the electronic processor 215 is configured to determine that the mining machine 150 is heading to the left (a current heading). Similarly, when the distance between the mining machine 150 and the rib 255a increases, while the distance between the mining machine 150 and the rib 255b decreases, the electronic processor 215 is configured to determine that the mining machine 150 is heading to the right (a current heading). In some room and pillar mines, it is generally desirable for mine features to be parallel or perpendicular. In some embodiments, the current heading may take the form of a point or a vector in a two-dimensional or three-dimensional coordinate map of the mine, with the point or the vector representing one or more of a desired position, a direction of travel, and a speed of travel. For example, FIG. 8 illustrates a two-dimensional coordinate map of a mine generated using data detected using the lidar sensors 205.

In some embodiments, the electronic processor 215 determines the current heading of the mining machine 150 based on supplementary data collected by the other sensors 210, such as ultra-wideband sensors, image sensors, and the like, associated with the mining machine 150 in addition to the data received from the lidar sensor 205. For example, the electronic processor 215 may receive supplementary data from motor sensors (of the other sensors 210), such as speed and direction of the pair of left and right tracks 190a-b of the mining machine 150 ("heading data"). The motor sensors may include, for example, rotary encoders, optical encoders, current sensors, or Hall effect sensors, functionally coupled to the left and right track motors 212, 213 and configured to detect and output an indication of motor rotational position, speed, and/or acceleration. The electronic processor 215 may use this supplementary data to supplement the data received from the lidar sensor 205 when determining the current heading of the mining machine 150. Alternatively or in addition, the data collected by the other sensors 210 may be used to improve accuracy and reliability of the data collected, for example, by the lidar sensors 205. For example, in some embodiments, the data collected by the other sensors 210 may be used to improve accuracy and reliability of a heading measurement by using both the data received from the lidar sensor 205 and the data collected by the other sensors 210 as input into a sensor fusion algorithm (for example, a Kalman filter). As another example, in some embodiments, the supplementary data may be used to improve a confidence score associated with a confidence that the one or more identified objects (used for determining the current heading) are correctly identified as, for example, a mine rib 255a, 255b.

After determining the current heading of the mining machine 150, the electronic processor 215 compares the current heading to a target heading of the mining machine 150 (at block 315). The target heading of the mining machine 150 represents a target or planned travel path or travel trajectory of the mining machine 150. In some embodiments, the target heading may take the form of a series of points or vectors in a two-dimensional or three-dimensional coordinate map of the mine, with the points or vectors representing one or more of desired positions, directions of travel, and speeds of travel. In some embodiments, the target heading of the mining machine 150 is stored in the memory 220 of the controller 200. The target heading may be entered and stored by an operator via a keypad, touch screen, or other input/output devices coupled to the input/output interface 225, or may be received and stored from a remote computing device communicating with the controller 200 via the input/output interface 225 and a network (for example, the Internet or a local area network). Accordingly, the electronic processor 215 may access the target heading of the mining machine 150 from the memory 220.

Based on the comparison of the current heading of the mining machine 150 and the target heading of the mining machine 150, the electronic processor 215 determines whether the mining machine 150 is following the target heading of the mining machine 150. In other words, the electronic processor 215 may determine whether the mining machine 150 has deviated from the target heading of the mining machine 150. The mining machine 150 has deviated from the target heading of the mining machine 150 when the current heading varies (or is different from) the target heading of the mining machine 150.

In response to the current heading being different from the target heading of the mining machine 150 by a predetermined amount, the electronic processor 215 controls the mining machine 150 to adjust the current heading of the mining machine 150 (at block 320). In other words, in response to a determined difference between the current heading of the mining machine 150 and the target heading of the mining machine 150, the electronic processor 215 controls the mining machine 150 to correct for the difference. In some embodiments, the predetermined amount is any value or the smallest potential nonzero value for the precision of measurement used. Accordingly, in these embodiments, when the current heading is determined to differ from the target heading of the mining machine 150 by any amount (in example, when there is any variance), the electronic processor 215 controls the mining machine 150 to adjust the current heading of the mining machine 150 (at block 320). For example, the electronic processor 215 may subtract numerical representations of the target heading from the current heading (or vice versa) in block 315. In other words, in block 315, the electronic processor 215 may determine a difference between the current heading and the target heading of the mining machine 150 (a difference amount). Then, (a) when the result of the subtraction is zero, indicating that the target heading and the current heading are the same, the electronic processor 215 does not control the mining machine 150 to adjust the current heading of the mining machine 150 (for example, the electronic processor 215 instead returns to block 305), and (b) when the result is non-zero, indicating at least some variance between the target heading and the current heading, the electronic processor 215 controls the mining machine 150 to adjust the current heading of the mining machine 150 (block 320). In some embodiments, a nonzero value is selected as the predetermined amount such that some variance between target and current headings is tolerated before the electronic processor 215 automatically controls the mining machine 150 to adjust the current heading of the mining machine 150.

In some embodiments, the electronic processor 215 automatically controls the mining machine 150 to adjust the current heading of the mining machine 150 by controlling one or more components of the mining machine 150. For example, the electronic processor 215 may control the left track 190a (via the left track motor 212), the right track 190b (via the right track motor 213), or both to adjust the current heading of the mining machine 150. As another example, the electronic processor 215 may control the cutting system motors 211 to compensate for the difference between the current heading of the mining machine 150 and the target heading of the mining machine 150. For example, the electronic processor 215 may control the cutting system motors 211 to shift the position of the cutters 160 vertically or horizontally to more closely cut along the target heading.

In some embodiments, the electronic processor 215 controls the mining machine 150 based on a difference amount between the target heading of the mining machine 150 and the current heading of the mining machine 150. For example, the greater the difference amount is, the greater a control adjustment the electronic processor 215 controls for the mining machine 150. In contrast, the smaller the difference amount is, the less of a control adjustment the electronic processor 215 controls for the mining machine 150. In other words, the control adjustment amount is proportional to the difference amount, in some embodiments.

In some embodiments, the controller 200 is part of an onboard control system of the mining machine 150. The onboard control system collects the data from the lidar sensors 205, the other sensors 210, or a combination thereof for real-time control of the mining machine 150.

In some embodiments, the electronic processor 215 stores the data received from the lidar sensor 205, the other sensors 210, or a combination thereof in the memory 220 of the controller 200. Furthermore, the electronic processor 215 may evaluate the data received from the lidar sensor 205, the other sensors 210, or a combination thereof to identify relevant mine features and discards irrelevant data.

In some embodiments, the electronic processor 215 uses the current heading, the distance between the mining machine 150 and at least one of the mine ribs 255a or 255b, or a combination thereof as a feedback mechanism to a machine track differential bias. For example, the feedback mechanism may cause the set of left and right tracks 190a-b to be maintained at different speeds as may be necessary to maintain a consistent cutting direction for the mining machine 150 (for example, when the mining machine 150 is in the presence of lateral forces generated by the cutting action against a seam) and to correct for any measured deviation from the desired cutting direction (in example, the target heading of the mining machine 150).

Alternatively or in addition, in some embodiments, the raw data (for example, the current heading of the mining machine 150 and the distance between the mining machine 150 and at least one of the mine ribs 255a or 255b) may be superimposed over video, still camera images, or the like by, for example, the mining machine 150 (e.g., the controller 200) or a remote operator control system. The superimposed video or still camera images may be provided to an operator at a remote location (e.g., on an electronic display of an operator's control system) for an enhanced understanding of the mining situation. The operator may then control the mining machine remotely (for example, sending control signals to the controller 200 via the input/output interface 225) based on the enhanced understanding of the mining situation. For example, as noted above, the electronic processor 215 may automatically control the mining machine 150 (control a heading of the mining machine 150). However, in some embodiments, the operator may override the automatic control of the mining machine 150 performed by the electronic processor 215. The operator may override the automatic control of the mining machine 150 using, for example, the superimposed video or still camera images described above.

As noted above, in some embodiments, the current heading of the mining machine 150 may take the form of a point or a vector in a two-dimensional or three-dimensional coordinate map of the mine, with the point or the vector representing one or more of a desired position, a direction of travel, and a speed of travel. Accordingly, in some embodiments, the two-dimensional or three-dimensional coordinate map of the mine (including the point or the vector representing the current heading of the mining machine 150) may be provided to an operator at a remote location for an enhanced understanding of the mining situation (via m electronic display). In some embodiments, the operator at the remote location may use the two-dimensional or three-dimensional coordinate map of the mine (including the point or the vector representing the current heading of the mining machine 150) to override the automatic control of the mining machine 150 performed by the electronic processor 215.

Although not illustrated in FIG. 5, in some embodiments, after step 320, the electronic processor 215 loops back to step 305 to provide continuous control of the mining machine heading. Additionally, although not illustrated in FIG. 5, in some embodiments, after step 315, when the current heading does not differ from the target heading by the predetermined amount, the electronic processor 215 loops back to step 305 to provide continuous control of the mining machine heading. For example, the electronic processor provides continuous control of the mining machine heading by receiving "updated" data from the one or more lidar sensors 205 and performing one or more of the steps included in the method 300 of FIG. 5 using the "updated" data.

Accordingly, the embodiments described herein provide methods and systems for controlling a heading of a mining machine while the mining machine performs a cutting operation. In particular, the methods and systems described herein provide for controlling a heading of the mining machine by determining a heading relative to the mine works behind the machine, which is measured by machine-mounted lidar sensors. In other words, the methods and systems described herein provide for controlling a heading of a mining machine without the need for any external (off machine) sensors or mine infrastructure, such as beacons, which are a maintenance issue for mines.

What is claimed is:

1. A system for controlling a heading of a mining machine while the mining machine performs a cutting operation, the system comprising:
   a cutting system of the mining machine;
   a set of tracks of the mining machine including a left track and a right track;
   a first lidar sensor mounted to the mining machine, the first lidar sensor configured to emit a pulse of light towards a previously cut mining surface and receive a pulse of light reflected back from the previously cut mining surface; and
   an electronic processor configured to
      receive data from the first lidar sensor based on the pulse of light received by the first lidar sensor,
      determine a current heading of the mining machine based on the data received from the first lidar sensor,
      compare the current heading to a target heading of the mining machine, and
      in response to the current heading being different from the target heading of the mining machine by a predetermined amount, control the mining machine to adjust the current heading of the mining machine, wherein the electronic processor is configured to control the mining machine to adjust the current heading of the mining machine by controlling at least one selected from a group consisting of the left track and the right track.

2. The system of claim 1, wherein the first lidar sensor is mounted to a rear portion of the mining machine.

3. The system of claim 2, further comprising a second lidar sensor mounted to the rear portion of the mining machine, wherein the first lidar sensor has a first detection range and the second lidar sensor has a second detection range different from the first detection range.

4. The system of claim 3, wherein the electronic processor is configured to determine the current heading of the mining machine based on data received from the first lidar sensor and data received from the second lidar sensor.

5. The system of claim 1, further comprising a second lidar sensor, wherein the first lidar sensor is mounted to a first side portion of the mining machine and the second lidar sensor is mounted to a second side portion of the mining machine different from the first side portion of the mining machine.

6. The system of claim 5, wherein the electronic processor is configured to determine the current heading of the mining machine based on the data received from the first lidar sensor and data received from the second lidar sensor.

7. The system of claim 1, wherein the first lidar sensor is mounted to a front portion of the mining machine.

8. The system of claim 7, further comprising a second lidar sensor mounted to the front portion of the mining machine, wherein the first lidar sensor is configured to emit a first pulse of light towards a first previously cut mining surface and the second lidar sensor is configured to emit a second pulse of light towards a second previously cut mining surface, wherein the first previously cut mining surface has a different height level than the second previously cut mining surface.

9. The system of claim 1, wherein the electronic processor is configured to control the mining machine to adjust the current heading of the mining machine by controlling both the left track and the right track with a track differential bias to maintain the left track and right track at different speeds to maintain a consistent cutting direction.

10. The system of claim 1, wherein the electronic processor is further configured to control the mining machine to adjust the current heading of the mining machine by controlling the cutting system of the mining machine to shift a position of a cutter of the mining machine to cut along the target heading.

11. A method for controlling a heading of a mining machine while the mining machine performs a cutting operation, the method comprising:
receiving data from a first lidar sensor mounted to the mining machine, wherein the first lidar sensor is configured to emit a pulse of light towards a previously cut mining surface and receive a pulse of light reflected back from the previously cut mining surface;
determining, with an electronic processor, a current heading of the mining machine based on data received from the first lidar sensor, the data generated by the first lidar sensor based on the pulse of light received by the first lidar sensor;
comparing, with the electronic processor, the current heading to a target heading of the mining machine; and
in response to the current heading being different from the target heading of the mining machine by a predetermined amount, controlling, with the electronic processor, the mining machine to adjust the current heading of the mining machine by controlling at least one track of a set of tracks of the mining machine.

12. The method of claim 11, further comprising:
generating a digital three-dimensional representation of the previously cut mining surface; and
providing the digital three-dimensional representation of the previously cut mining surface to an operator of the mining machine at a remote location.

13. The method of claim 11, further comprising:
receiving supplementary data from one or more other sensors associated with the mining machine, wherein determining the current heading of the mining machine is based on the data received from the first lidar sensor and the supplementary data from the one or more other sensors.

14. The method of claim 11, wherein determining the current heading of the mining machine includes
identifying one or more objects within a surrounding of the mining machine, and
measuring an angle and a distance to the one or more objects relative to the mining machine, and
determining the current heading of the mining machine based on the angle and the distance to the one or more objects relative to the mining machine.

15. The method of claim 14, wherein determining the current heading of the mining machine includes determining that the current heading of the mining machine is a straight heading when the distance to the one or more objects relative to the mining machine is constant.

16. The method of claim 11, wherein controlling the mining machine to adjust the current heading of the mining machine includes controlling both a left track and a right track of the set of tracks of the mining machine with a track differential bias to maintain the left track and right track at different speeds to maintain a consistent cutting direction.

17. The method of claim 11, wherein controlling the mining machine to adjust the current heading of the mining machine further includes controlling a cutting system of the mining machine to shift a position of a cutter of the mining machine to cut along the target heading.

18. The method of claim 11, further comprising:
receiving updated data from the first lidar sensor;
determining an updated current heading of the mining machine based on the updated data received from the first lidar sensor;
comparing the updated current heading to the target heading of the mining machine; and
in response to the updated current heading being different from the target heading of the mining machine by the predetermined amount, controlling the mining machine to adjust the updated current heading of the mining machine.

19. The method of claim 11, further comprising:
receiving data from a second lidar sensor mounted to the mining machine,
wherein determining the current heading of the mining machine includes determining the current heading of the mining machine based on the data received from the first lidar sensor and data received from the second lidar sensor.

20. The method of claim 19, wherein receiving the data from the first lidar sensor includes receiving the data from the first lidar sensor mounted to a rear portion of the mining machine and receiving the data from the second lidar sensor includes receiving the data from the second lidar sensor mounted to a side portion of the mining machine.

* * * * *